United States Patent [19]
Kwa

[11] Patent Number: 5,255,111
[45] Date of Patent: Oct. 19, 1993

[54] FULL-DUPLEX OPTICAL TRANSMISSION SYSTEM

[75] Inventor: Peter T. H. Kwa, Kanata, Canada

[73] Assignee: Northern Telecom Limited, Montreal, Canada

[21] Appl. No.: 8,235

[22] Filed: Jan. 21, 1993

Related U.S. Application Data

[63] Continuation of Ser. No. 630,662, Dec. 20, 1990, abandoned.

[51] Int. Cl.$^5$ ................. H04B 10/24; H04B 10/00
[52] U.S. Cl. ....................... 359/113; 359/152; 359/158; 372/32; 375/107
[58] Field of Search ............ 359/113, 114, 135, 136, 359/137, 152, 153, 154, 158; 370/19, 29, 32, 101, 132; 375/107

[56] References Cited

U.S. PATENT DOCUMENTS

| | | | |
|---|---|---|---|
| 4,168,427 | 9/1979 | Hubbard | 359/152 |
| 4,195,269 | 3/1980 | Ettenberg et al. | 332/7.51 |
| 4,451,827 | 5/1984 | Kahn et al. | 357/113 |
| 4,460,992 | 7/1984 | Gutleber | 370/19 |
| 4,687,957 | 8/1987 | O'Neil | 307/311 |
| 4,773,074 | 9/1988 | Hunsperger et al. | 372/50 |
| 4,835,764 | 5/1989 | Sulzbacher et al. | 370/29 |

Primary Examiner—Richard E. Chilcot, Jr.
Assistant Examiner—Rafael Bacares
Attorney, Agent, or Firm—John E. Mowle

[57] ABSTRACT

An optical apparatus for transfer of full-duplex data signals over an optical waveguide comprises electro-optic transducers, coupled to the optical waveguide at opposite ends thereof. The electro-optic transducers are responsive, in a first mode, to drive signal pulses to produce transmit optical signal pulses for transmission along the optical waveguide and responsive, in a second mode, to receive optical signal pulses detected by the electro-optic transducer means to produce detected signal pulses. Drivers, coupled to the electro-optic transducers, generate pairs of the drive signal pulses in response to each transmit bit of the data signals. Receivers, also coupled to the electro-optic transducers, generate receive bits of the data signals in response to at least one of each pair of the detected signal pulses. A switch switches the electro-optic transducer means between the first mode and the second mode, couples the driver to the electro-optic transducer means in the first mode, and couples the electro-optic transducer means to the receiver in the second mode. The time delay between each pair of the transmit optical signal pulses differs from the time delay between each pair of the receive optical signal pulses, and the duty cycle of the pulses is limited so that at any point along the optical waveguide there is no interference between at least one transmit optical signal pulse and one receive optical signal pulse of each pair.

13 Claims, 5 Drawing Sheets

FULL-DUPLEX OPTICAL TRANSMISSION SYSTEM

This application is a continuation of Ser. No. 07/630,622, filed Dec. 20, 1990, now abandoned.

FIELD OF THE INVENTION

The present invention relates to digital signal transmission systems and is particularly concerned with full-duplex optical transmission of signals over an optical waveguide with a transmitter/receiver device on each end thereof.

BACKGROUND OF THE INVENTION

Communication networks often require bidirectional transmission links. The most direct implementation in fiber optics is to use two unidirectional waveguides, one waveguide for data transmission in a first direction, the other waveguide for data transmission in the reverse direction, with distinct transmit and receive devices on either end of each of the waveguides. Alternatively, a single waveguide can be used with optical splitter at opposite ends of the waveguide to provide optical paths to transmitters and receivers at each end of the waveguide. Optical splitter can be designed to have directional coupling characteristics, i.e. signals to the far end ("go" signals) can be separated from signals from the far end ("return" signals), enabling full-duplex communications. However, reflection points in the link, such as connectors, lead to cross talk between the communications paths. The suppression of crosstalk requires extra effort, such as the application of wavelength division multiplexing (WDM) or frequency division multiplexing (FDM). The former utilizes different optical carriers, the latter utilizes different electrical carriers for the go and return paths.

As an alternative, it has been suggested that a laser diode, or light emitting diode (LED) could be used as both a light transmitter and a light receiver. This would thereby remove the need for optical splitter and photodiodes at the ends of the optical waveguide to separate transmit and receive paths. The potential benefits of using a single device as both an emitter and a detector are great in that the parts count and assembly time are reduced considerably. However, transmission systems to date, using such a concept, have not been capable of full-duplex transmission.

An example of a method and apparatus that has been created for the purpose of bidirectional communication over a single waveguide can be found in U.S. Pat. No. 4,879,763 issued Nov. 7, 1989 in the name of T. H. Wood, entitled "Optical Fiber Bidirectional Transmission System", in which a bidirectional optical communications system is described using a multiple quantum well structure as both a photodetector and light modulator.

Technologies for using a laser or light emitting diode (LED) as a light emitter and detector are described in the following U.S. patents: U.S. Pat. No. 4,773,074 issued Sep. 20, 1988 in the name of Hunsperger et al., entitled "Dual Mode Laser/Detector Diode for Optical Fiber Transmission Lines", in which a semiconductor diode device for direct optical coupling to an optical signal transmission apparatus is disclosed; U.S. Pat. No. 4,195,269 issued Mar. 25, 1980 in the name of Ettenberg et al., entitled "Two-way Single Fiber Optical Communication System", in which is disclosed an injection laser whose characteristics vary upon radiation impinging on the laser such that the laser operates as a light detector; and U.S. Pat. No. 4,687,957 issued Aug. 18, 1987 in the name of V. P. O'Neil, entitled "Fiber Optic Transceiver", in which a half-duplex transceiver circuit is disclosed in which a single diode acts as both the light emitter and the light detector.

Since an optical device can only act as an emitter or detector at any one point in time, but not simultaneously, half-duplex seems inevitable for bidirectional transmission over a single fiber. The present invention proves otherwise.

SUMMARY OF THE INVENTION

It is an object of the present invention to provide a system wherein full-duplex transmission may occur over a single optical waveguide with a single transmit/receive device on each end of the optical waveguide.

Stated in other terms, the present invention is an optical apparatus for transfer of full-duplex data signals over an optical waveguide, the apparatus comprising: an electro-optic transducer means, coupled to the optical waveguide, responsive, in a first mode, to drive signal pulses to produce corresponding transmit optical signal pulses for transmission along the optical waveguide and responsive, in a second mode, to received optical signal pulses to produce detected signal pulses and reception means including decoding means, for generating a receive bit of the data signals in response to the detected signal pulses and driving means including encoding means responsive to each transmit bit of the data signals, for generating a pair of the drive signal pulses, each pair of drive signal pulses being within one bit period of the respective transmit bit of the data signals and wherein the time delay between each pulse of the corresponding pair of transmit optical signal pulses differs from that of the pair of receive optical signal pulses, and wherein the duty cycle of the transmit optical signal pulses is such that for any phase relationship between transmission of the pairs of transmit signal optical pulses and reception of the pairs of receive optical signal pulses there is no interference between at least one transmit optical signal pulse and one receive optical signal pulse of each pair and switch means for switching the electro-optic transducer means between the first mode and the second mode, for coupling the driving means to the electro-optic transducer means in the first mode, and for coupling the electro-optic transducer means to the reception means in the second mode.

The present invention also encompasses a method of transmitting full duplex data signals over a common path, the method comprising the steps of receiving over the common path a pair of receive signal pulses representing each receive bit of the full-duplex data signals and encoding each transmit bit of the data signals as a pair of drive signal pulses, the pair of drive signal pulses being within one bit period of the respective transmit bit of the data signals and transmitting over the common path a pair of corresponding transmit signal pulses in response to the drive signals, the time delay between each pulse of the pair of transmit signal pulses being different from that of the pair of receive signal pulses, and a duty cycle such that for any phase relationship between transmission of the pairs of transmit signal pulses and reception of the pairs of receive signal pulses there is no interference between at least one transmit signal pulse and one receive signal pulse of each pair.

Furthermore the invention defines a full-duplex transmission system for transfer of first and second data signals comprising: an optical waveguide for carrying optical signals and first and second electro-optic transducer means, coupled to the optical waveguide at opposite ends thereof, responsive, in a first mode, to first and second drive signal pulses, respectively, to produce first and second corresponding transmit optical signal pulses for transmission along the optical waveguide and responsive, in a second mode, to the second and first transmit optical signal pulses to produce first and second detected signal pulses and first reception means including first decoding means for generating first receive bits of the second data signals in response to first detected signal pulses and second reception means including second decoding means for generating second receive bits of the first data signals in response to second detected signal pulses and first driving means including first encoding means for generating a pair of the first drive signal pulses in response to each transmit bit of the first data signals, each pair of first drive signal pulses being within one bit period of the respective transmit bit of the first data signals and wherein the time delay between each pulse of the corresponding pair of first transmit optical signal pulses differs from that of the pair of second transmit optical signal pulses, and a duty cycle such that for any phase relationship between transmission of the pairs of first transmit optical pulses and the pairs of second transmit optical pulses there is no interference between at least one first transmit optical signal pulse and one second transmit optical signal pulse of each pair and second driving means including second encoding means for generating a pair of the second drive signal pulses in response to each transmit bit of the second data signals, each pair of second drive signal pulses being within one bit period of the respective transmit bit of the second data signals and first switch means, for switching the first electro-optic transducer means between the first mode and the second mode, for coupling the first driving means to the first electro-optic transducer means in the first mode, and for coupling the first reception means to the first electro-optic transducer means in the second mode and second switch means for switching the second electro-optic transducer means between the first mode and the second mode, for coupling the second driving means to the second electro-optic transducer means in the first mode, and for coupling the second electro-optic transducer means to the second reception means in the second mode.

BRIEF DESCRIPTION OF THE DRAWINGS

The invention will be further understood from the following description, by way of example, with reference to the accompanying diagrammatic drawings in which similar reference numerals are used in the different figures to denote similar parts and in which.

DETAILED DESCRIPTION

Figure 1:
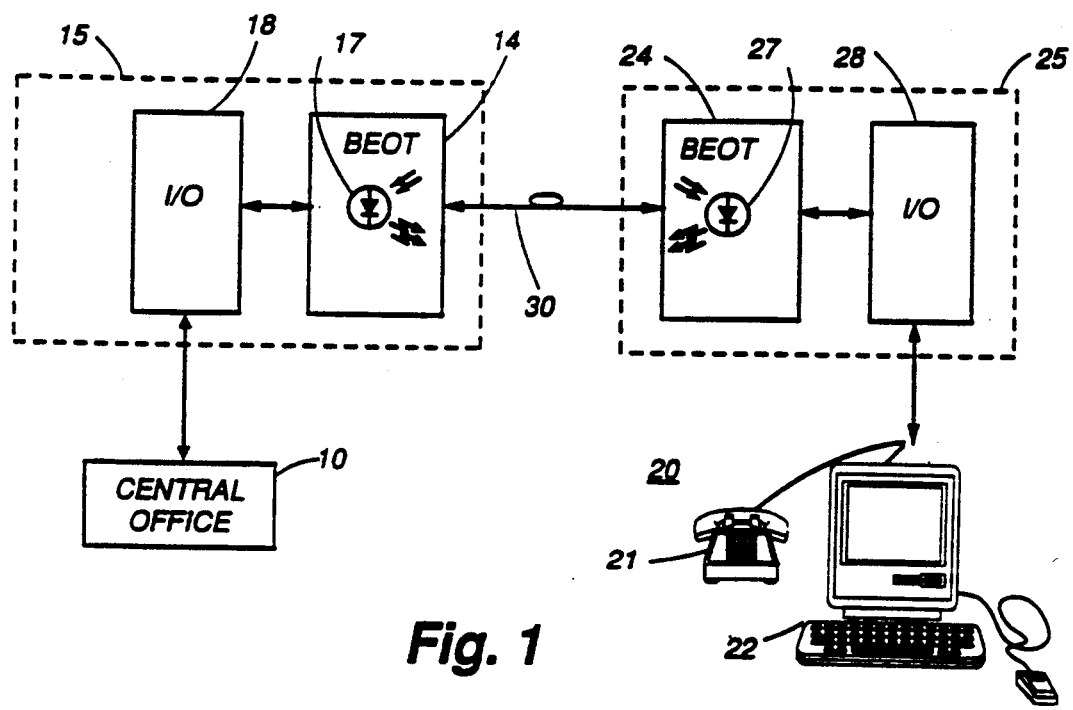
FIG. 1 is a block diagram of a transmission system between a central office and an end user.

FIG. 1 illustrates an example transmission system linking a central office 10 with an end user 20 via an optical waveguide 30. As illustrated, the end user 20 may communicate with the central office 10 either by digitized voice, as indicated by the telephone 21, or by data, as illustrated by the computer 22. At each end of the optical waveguide 30 is a line card block 15 and 25 respectively. Each line card block 15, 25 comprises a bidirectional electro-optic transceiver (BEOT) 14,24 which performs the receive function of converting optical signals to electrical signals and the transmit function of converting electrical signals to optical signals. Each BEOT 14,24 is coupled to the optical waveguide 30 via an electro-optic transducer means 17, 27 which converts electrical signals into light pulses when forward biased, and when reversed biased or zero biased can be used to convert light pulses to electrical signals. The electro-optic transducer means 17, 18 may be a laser, a light emitting diode (LED), or like element. The input/output (I/O) devices 18 and 28 can comprise such elements as analog to digital converters, digital to analog converters, first-in-first-out (FIFO) buffers, etc. to convert, monitor and control the data entering and leaving the BEOTs 14, 24.

Figure 2:
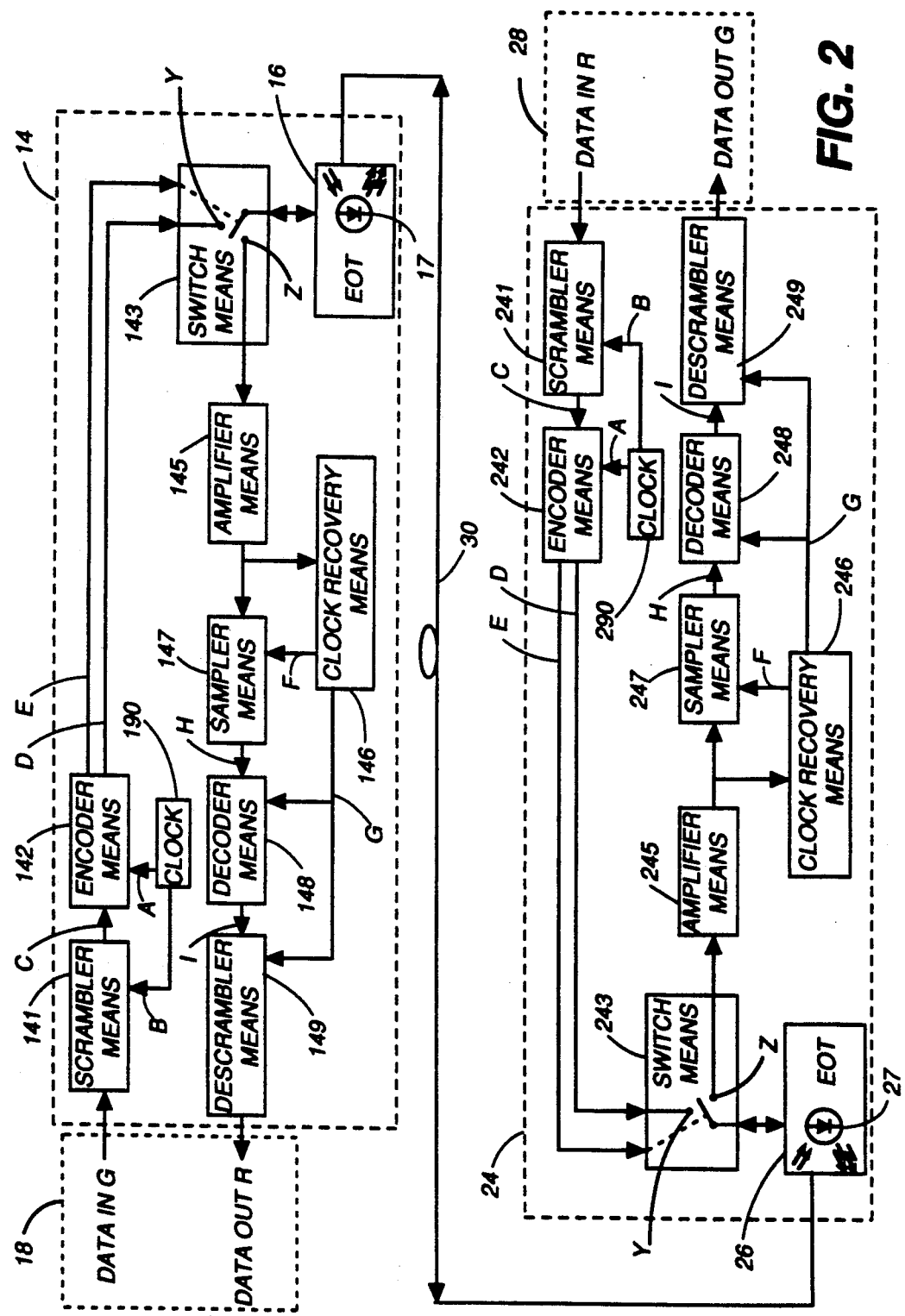
FIG. 2 is a block diagram illustrating in greater detail the functioning of the transmission system of FIG. 1.

FIG. 2 provides a more in-depth drawing of the block diagram of FIG. 1 further illustrating the BEOTs 14, 24. From this figure it is clear that the BEOTs 14, 24 each comprise a scrambler means 141, 241; an encoder means 142, 242; a switch means 143, 243; an amplifier means 145, 245; a clock recovery means 146, 246; a sampler means 147, 247; a decoder means 148, 248; a descrambler means 149, 249; a clock 190, 290; and an electro-optic transducer (EOT) 16, 26.

For ease of description, only BEOT 14 will be described, it being understood that the components and functioning of BEOT 24 are identical. However, it must be understood that although the BEOTs 14, 24 are conceptually identical, they will communicate with each other; each BEOT using data which has been encoded in a predetermined manner with respect to each other, as will be explained further.

The scrambler means 141, clocked by timing signals B from the clock 190, is provided to scramble any incoming data on the DATA IN G line (DATA IN R line in the case of line card block 25). The scrambler means 141 can be a standard SONET (Synchronous Optical NETwork) scrambler which is in common use in fiber optic transmission systems. The scrambled data signal C is then passed through the encoder means 142, clocked by timing signals A from the clock 190 the encoder means encodes each transmit bit of the scrambled data signal C as pairs of drive signal pulses D, the pairs of drive signal pulses being generated within a time interval equal to the bit period of the respective transmit bit of the scrambled data signal C. A control signal E is produced by the encoder means 142 which controls the switch means 143 and causes it to toggle between a transmit position Y and a receive position Z. In the transmit position Y, the pairs of drive signal pulses are passed on to the EOT 16 so that the data therein can be converted and launched into the optical waveguide 30 as the optical "go" signal. In the receive position Z, the optical "return" signal from line card block 25 is detected and converted into an electrical current by the EOT 16.

Figure 3A:
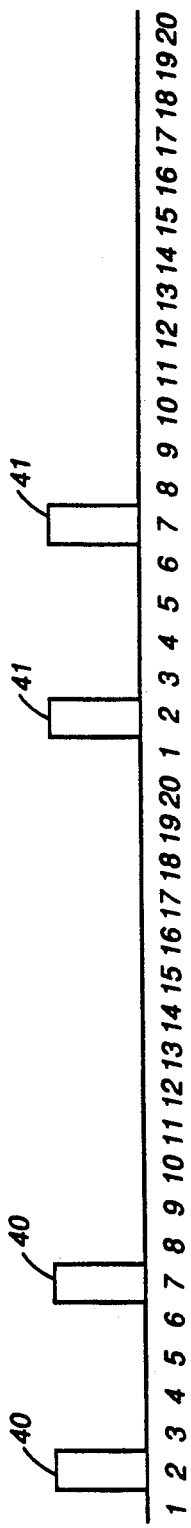
FIGS. 3a-d are timing diagrams illustrating the relative timing of data transmission signals according to the present invention.
Figure 3B:
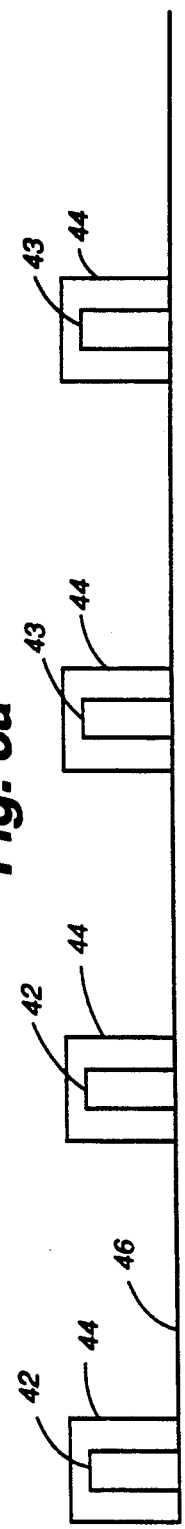

With reference to FIG. 3b, the switch means 143 is an electronic switch which is normally in the receive position Z, as illustrated by the base line 46. To transmit data, the switch means 143 is switched to the transmit position Y for short periods of time. A control signal E defines a time period for transmission by generating a transmit window 44. Pairs of drive signal pulses or "go" signal D is represented by data pulse pairs 42, 43. In response to the go signal D the electro-optic transducer means 17, emits light thus launching the optical "go" signal into the optical waveguide 30. The time periods for transmission are set such that the transmit window 44 is greater than each pulse of a transmitted data pulse pair 42, 43. This is to ensure that a) the electro-optic transceiver 16 has time to switch from the receive mode to the transmit mode and vice versa, and b) all electrical transients are kept away from the input of the sensitive amplifier means 145.

To receive data, the switch means 143 in response to the control signal E is switched back to its normal position, i.e. the receive position Z. In this position light pulses coming from the optical waveguide 30 are detected and converted into current pulses by the electro-optic transducer means 17 which is reversed, or zero, biased to thus operate as a detector. The amplifier means 145, which can be any typical amplifier, then converts the current pulses into voltage pulses After amplifying the voltage pulses they are sampled by the sampler means 147, which can be a D-type flip-flop, and processed by a clock recovery means 146, which can be a phase locked loop (PLL) circuit, to recover timing information. The clock recovery means 146 provides a clock input F for the sampler means 147 and furthermore provides a state timing signal G to the decoder means 148 which is identical to the state timing B. Once received encoded data H has been recovered from the voltage pulses it is decoded by the decoder means 148, which will be discussed in more detail further, and then descrambled by the descrambler means 149, which is typically a conventional descrambler adapted for SONET, similar to the scrambler means 141, to thus place received data on the DATA OUT R line (DATA OUT G line in the case of line card block 25).

In operation the reception of light pulses is not possible during the transmit windows 44, and conventional wisdom dictates half-duplex transmission. However, with the following discussion, it will be evident that the capability of full-duplex transmission exists.

To allow full-duplex transmission between the central office 10 and the end user 20, an encoding algorithm has been devised for the encoder means 142. The encoder means 142 encodes each transmit bit of the scrambled data signal C as one pair of drive signal pulses D, each pair of drive signal pulses D being generated within a time interval equal to one bit period of a respective transmit bit of the scrambled data signal C. The encoder means 142 divides each scrambled data signal C transmit bit period into twenty equal time intervals, each pulse of a pair of transmit optical signal pulses and each pulse of a pair of receive optical signal pulses occupies a time interval equal to one of the twenty time intervals. Preferably, the time delay between each pulse of a pair of transmit optical signal pulses differs from the time delay between each pulse of a pair of receive optical signal pulses by one quarter of a data signal bit period. Encoding of the data signals in this manner assures that although one pulse of the data pulse pair can be lost due to switching between receive and transmit modes at the EOT 16, 26, under certain phase conditions at least one of each pulse pair will be received which will be sufficient to recover the transmitted information and necessary timing information. Therefore, the "go" and "return" data encoded in this manner permit full duplex operation in the sense that under all operating conditions, i.e. all possible phasing relationships for transmit and receive signals optical, only one pulse of an incoming pulse pair may be blanked out by the EOT 16, 26 for a worst case phase relationship.

The encoding algorithm can be better understood with reference to FIGS. 3a-3d. In the "go" direction, transmit bits of the scrambled data signal C, for example logic ones, are encoded as pulse pairs 42, 43 in a 20 time period interval, i.e. a pulse will be transmitted during the second and twelfth (2, 12) time periods of the 20 time period interval, as illustrated in FIG. 3b. In the "return" direction, as viewed by line card block 15, logic ones are encoded by the encoder means 242 as pulse pairs 40, 41 in the 20 time period interval, e.g. a pulse will be transmit-ted during the second and seventh (2, 7) time periods of the 20 time period interval, as illustrated in FIG. 3a. A logic LO is transmitted if no light pulses are launched during the respective time intervals. Transmit windows 44 are provided, as described above, to allow the electro-optic transceiver 16 to switch from the receive mode to the transmit mode prior to the transmission of the "return" signal.

Figure 3C:
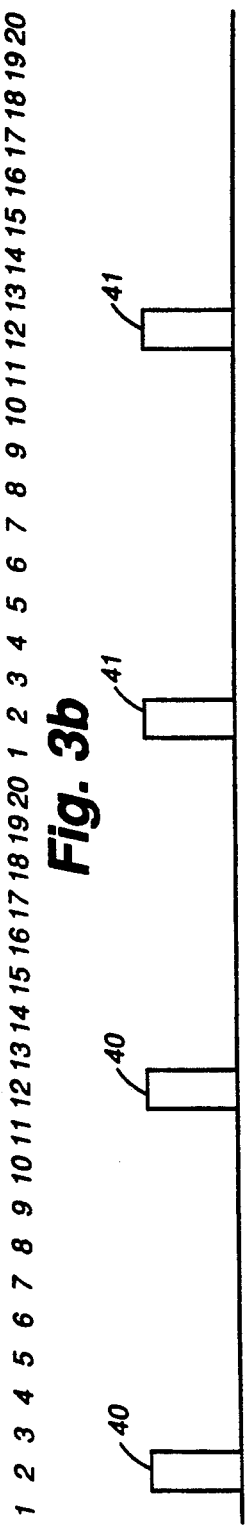
Figure 3D:
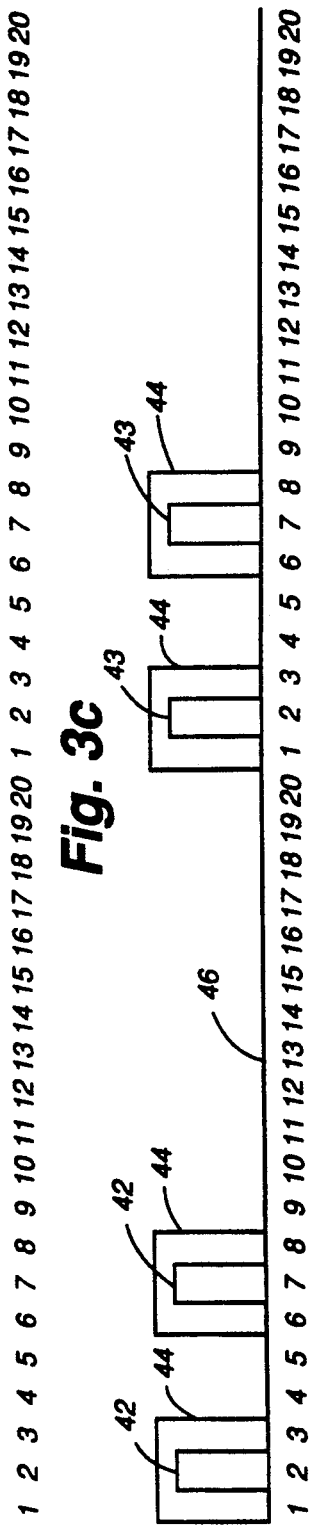

Alternatively, the "return" signal, as represented by data pulse pairs 40, 41, can be presented during the time periods 2 and 12 as illustrated in FIG. 3c, and the "go" signal, as represented by data pulse pairs 42, 43, can be injected during the time periods 2 and 7 as illustrated in FIG. 3d.

Consequently, with the arrangement described above, it is possible that one receive data of a pulse pair at the EOT 16 may be partially cut by the transmit window 44, and depending on what is left over for the sampler means 147, may or may not be registered. But, since the second pulse of the pulse pair is guaranteed to survive due to the encoding of the data, sufficient information is received to assert that a logic one was sent from the far end.

Figure 4:
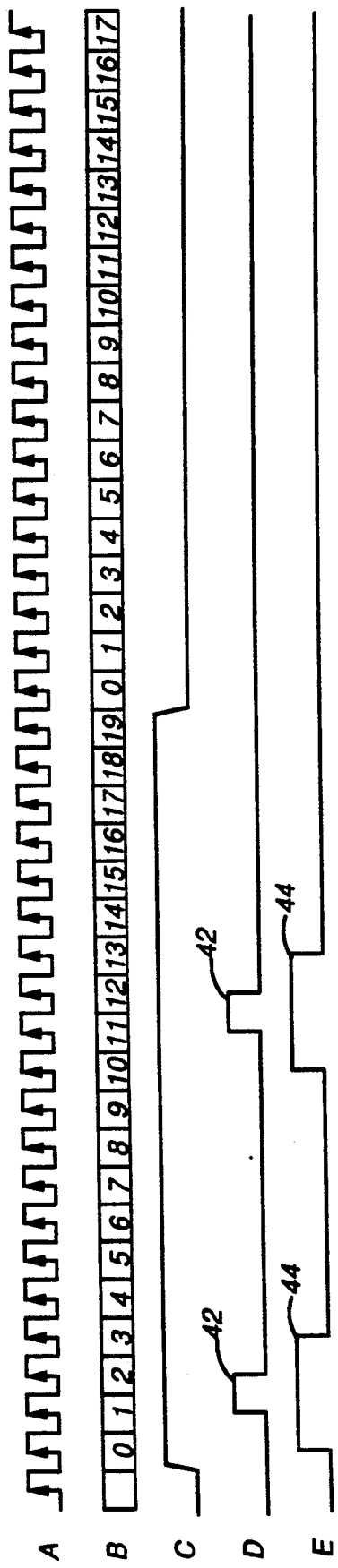
FIG. 4 is a timing diagram illustrating the relative timing of signals passing through an encoder means used in the transmission system of FIG. 2.

FIG. 4 is a timing diagram illustrating the timing of data signals into and out of the encoder 142. The state timing B is indicative of the time period of the data transmissions as discussed above. FIG. 4 illustrates the scrambled signal C fed into the encoder 142. The encoder 142 encodes the data and consequently outputs pairs of drive signal pulses D which are to be transmitted from line card block 15 to line card block 25. As is readily apparent, the pairs of drive signal pulses 42 which are output during states B or time periods, 2 and 12 and occurs approximately central to the transmit window 44.

Figure 5:
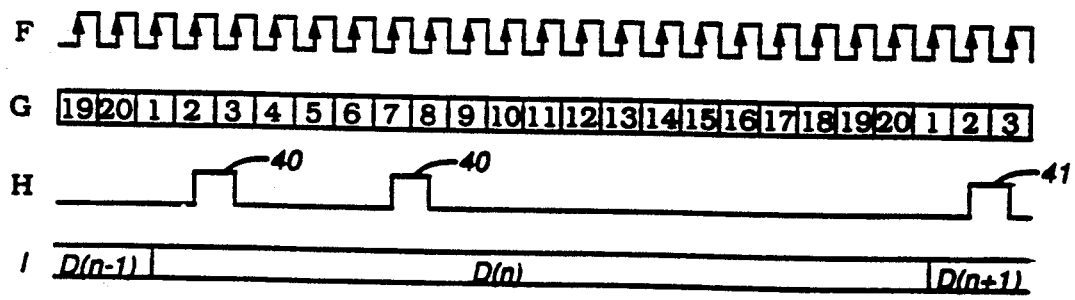
FIG. 5, which may be found on the first sheet of the drawings, is a timing diagram illustrating the relative timing of signals passing through the decoder means used in the transmission system of FIG. 2.

FIG. 5 illustrates the timing of the data signals active in the decoder means 148. The decoder means 148 comprises a single integrated circuit state machine and may be a Read Only Memory (ROM). The state timing G is indicative of the time period of the data transmissions as discussed above. The received encoded data signal H is representative of the signal received from the line card block 25 and fed into the decoder means 148. Note that the receive data pulse pairs 40, 41 are presented during the second and seventh time periods of the 20 time period interval. The decoder means 148 accesses a look up table stored in the ROM to decode the received encoded data signal H and consequently output decoded data I.

Figure 6:
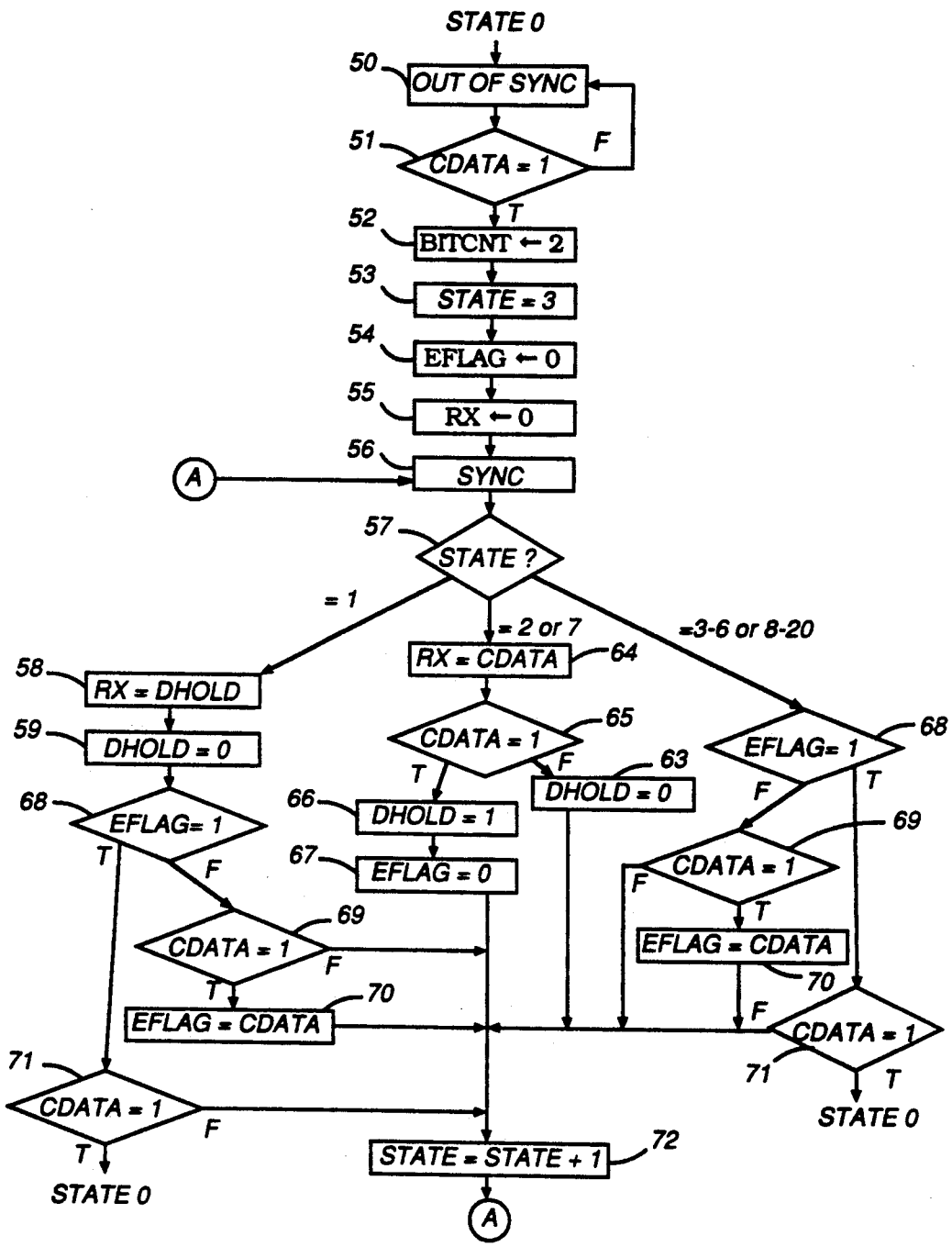
FIG. 6 is a state diagram illustrating the functioning of the decoder means used in the transmission system of FIG. 2.

The functioning of the decoder means 148 can be further understood from the state diagram of FIG. 6 and the following state machine rules.

DECODER STATE MACHINE RULES

1. Power On
   states 21-31 are considered invalid;
   states 1-20 are valid but out of sync will be detected;
   the finite state machine (FSM) assumes state 0—out of sync (step 50).

2. State 0—Out of Sync State
   FSM waits for a first 'one' to be received, i.e. CDATA=1 (step 51);
   if a 'one' is not received, the FSM remains in state 0—out of sync (step 50);
   if a 'one' is received:
   FSM assumes it is in position 2 of the 20 time period interval, i.e. BITCNT=2 (step 52);
   FSM assumes state 3 (step 53);
   an "error flag" EFLAG is initialized to 'zero' (step 54);
   a "received data" variable RX is initialized to 'zero' (step 55);
   FSM assumes a synchronized (SYNC) condition (step 56).

3. States 3 . . . 6, 8 . . . 20 (for a (2,7) encoding) (States 3 . . . 11, 13 . . . 20 for a (2,12) orthogonal coding)
   if a 'one' is detected, i.e. CDATA=1 for the first time (step 69):
   the FSM sets the "error flag" bit EFLAG to 'one'—however, the FSM stays in sync (step 70);
   the FSM assumes STATE+1, i.e. the next sequential state (step 72);
   if a 'zero' is detected, i.e. CDATA=0, the FSM assumes STATE+1, i.e. the next sequential state (step 72);
   if the "error flag" bit has previously been set, i.e. EFLAG=1 (step 68) and a 'one' is detected, i.e. CDATA=1 (step 71), i.e. a second error has occured, the FSM assumes state 0—out of sync (step 50);
   if the "error flag" bit has previously been set, i.e. EFLAG=1 (step 68) and a 'zero' is detected, i.e. CDATA=0 (step 71), the FSM assumes STATE+1, i.e. the next sequential state (step 72).

4. States 2, 7/12
   either a 'one' or 'zero' is valid in these states;
   the data CDATA is stored in the received data variable RX, i.e. RX=CDATA (step 64);
   if a 'one' is detected, i.e. CDATA=1 (step 65):
   a "data hold" bit is set to 'one', i.e. DHOLD=1 (step 66);
   the "error flag" is reset, i.e. EFLAG=0 (step 67), i.e. the error that was previously detected was likely not an out of sync error;
   if a 'zero' is detected, i.e. CDATA=0 (step 65): the "data hold" bit is set to 'zero', i.e. DHOLD=0 (step 63); the FSM assumes a state of STATE+1, i.e. the next sequential state (step 72).

5. State 1
   the "received data" variable is set equal to the "data hold" bit, i.e. RX=DHOLD (step 58);
   the "data hold" bit is cleared, i.e. DHOLD=0 (step 59) ready for the next bit sequence;
   same error checking as states 3 . . . 6, 8 . . . 20 (3 . . . 11, 13 . . . 20) (steps 68-71).

The decision as to which state (1-20) is processed is governed by step 57.

It is to be noted that as a single electro-optic transducer means 17 is to be used in the present invention as an emitter and a detector, the intrinsic (not drive circuit related) recovery time of the emitter to detector transition must be fast; i.e. in the case of an electro-optic transducer means 17 which is a laser the remaining laser-injected-carriers following laser turn-off must decay to a dark current value consistent with the required detection sensitivity of the electro-optic transceiver 16. Otherwise, a transmit-induced background photocurrent will adversely affect the received data.

Of coursse it can be readily realized that the transmission of the "go" and "return" signals could be during time periods other than (2,7) and (2, 12), respectively, or (2,12) and (2,7), respectively, as described by example above. However, to achieve full-duplex bidirectional communications over a transmission medium it is necessary to ensure that the data sent in opposite directions are encoded in the manner described, relative to each other. This ensures correct reception of the transmitted data, as well as the necessary timing information, regardless of the phasing relationships of the transmit and receive optical signals. Furthermore, as stated above, the described encoding of the data allows for full-duplex transmission over a single optical waveguide 30 with a single electro-optical transducer means 17 on each end of the optical waveguide 30, thus providing the advantage of cost savings over traditional dual or single waveguide systems, and improved transmission speeds over half-duplex transmission systems.

Numerous modifications, variations, and adaptations may be made to the particular embodiments of the invention described above without departing from the scope of the claims.

I claim:

1. An optical apparatus for transfer of full-duplex data signals over an optical waveguide, the apparatus comprising:

an electro-optic transducer means, coupled to the optical waveguide, responsive, in a first mode, to drive signal pulses to produce corresponding transmit optical signal pulses for transmission along the optical waveguide and responsive, in a second mode, to received optical signal pulses to produce detected signal pulses;

reception means including decoding means, for generating a receive bit of the data signals in response to the detected signal pulses;

driving means including encoding means responsive to each transmit bit of the data signals, for generating a pair of the drive signal pulses, each pair of drive signal pulses being within one bit period of the respective transmit bit of the data signals, the pulses of each pair of drive signal pulses being spaced apart by a predetermined time period equal to the period of at least one pulse of the pair of pulses and both pulses of each pair of drive signal pulses having the same logic level;

wherein the time delay between each pulse of the corresponding pair of transmit optical signal pulses differs from that of the pair of receive optical signal pulses, and wherein the duty cycle of the transmit optical signal pulses is such that for any phase relationship between transmission of the pairs of transmit signal optical pulses and reception of the pairs of receive optical signal pulses there is no interference between at least one transmit optical signal pulse and one receive optical signal pulse of each pair; and switch means for switching the electro-optic transducer means between the first mode and the second mode, for coupling the driving means to the electro-optic transducer means in the first mode, and for coupling the electro-optic transducer means to the reception means in the second mode.

2. An apparatus as claimed in claim 1 wherein the time delay between each pulse of the pair of transmit optical signal pulses differs from that of the pair of receive optical signal pulses by one quarter of the data signal bit period.

3. An apparatus as claimed in claim 2 wherein the driving means further includes means for generating a transmit window for inhibiting reception of the receive optical signal pulses by the electro-optic transducer means, each transmit window encompassing a time interval of one transmit optical signal pulse and being greater than the duration of said transmit optical signal pulse.

4. An apparatus as claimed in claim 3 wherein the data signal transmit bit period is divided into twenty equal time intervals, each pulse of the pair of transmit optical signal pulses and each pulse of the pair of receive optical signal pulses occupies a time interval equal to one of the twenty time intervals, the pulses of each pair of either transmit or receive optical signal pulses occupies the second and seventh time intervals respectively, and the pulses of each pair of the other of transmit or receive optical signal pulses occupies the second and twelfth time intervals, respectively.

5. A method of transmitting full-duplex data signals over an optical waveguide, the method comprising the steps of:

receiving over the optical waveguide a pair of receive optical signal pulses representing each receive bit of the full-duplex data signals;

encoding each transmit bit of the data signals as a pair of drive signal pulses, the pair of drive signal pulses being within one bit period of the respective transmit bit of the data signals and the pulses of each pair of drive signal pulses being spaced apart by a predetermined time period equal to the period of at least one pulse of the pair of pulses and both pulses of each pair of drive signal pulses having the same logic level;

transmitting over the optical waveguide a pair of corresponding transmit optical signal pulses in response to the drive signal pulses, the time delay between each pulse of the pair of transmit optical signal pulses being different from that of the pair of receive optical signal pulses, and a duty cycle such that for any phase relationship between transmission of the pairs of transmit optical signal pulses and reception of the pairs of receive optical signal pulses there is no interference between at least one transmit optical signal pulse and one receive optical signal pulse of each pair.

6. A method as claimed in claim 5 wherein the time delay between each pulse of the pair of transmit signal pulses differs from that of the pair of receive signal pulses by one quarter of the data signal bit period.

7. A method as claimed in claim 6 further comprising the step of:

generating a transmit window for inhibiting reception of the receive signal pulses, each transmit window encompassing one transmit signal pulse and being greater than the duration of said transmit signal pulse.

8. A method as claimed in claim 7 wherein the data signal transmit bit period is divided into twenty equal time intervals, each pulse of a pair transmit optical signal pulses and each pulse of a pair of receive optical signal pulses occupies a time interval equal to one of the twenty time intervals.

9. A method as claimed in claim 8 wherein each transmit window is three time intervals in duration and the encompassed transmit signal pulse occurs substantially central to that transmit window.

10. A full-duplex transmission system for transfer of first and second data signals comprising:

an optical waveguide for carrying optical signals;

first and second electro-optic transducer means, coupled to the optical waveguide at opposite ends thereof, responsive, in a first mode, to first and second drive signal pulses, respectively, to produce first and second corresponding transmit optical signal pulses for transmission along the optical waveguide and responsive, in a second mode, to the second and first transmit optical signal pulses to produce first and second detected signal pulses;

first reception means including first decoding means for generating first receive bits of the second data signals in response to first detected signal pulses;

second reception means including second decoding means for generating second receive bits of the first data signals in response to second detected signal pulses;

first driving means including first encoding means for generating a pair of the first drive signal pulses in response to each transmit bit of the first data signals, each pair of first drive signal pulses being within one bit period of the respective transmit bit of the first data signals, the pulses of each pair of first drive signal pulses being spaced apart by a predetermined time period equal to the period of at least one pulse of the pair of first drive signal pulses and both pulses of each pair of first drive signal pulses having the same logic level;

wherein the time delay between each pulse of the corresponding pair of first transmit optical signal pulses differs from that of the pair of second transmit optical signal pulses, and a duty cycle such that for any phase relationship between transmission of the pairs of first transmit optical pulses and the pairs of second transmit optical pulses there is no interference between at least one first transmit optical signal pulse and one second transmit optical signal pulse of each pair;

second driving means including second encoding means for generating a pair of the second drive signal pulses in response to each transmit bit of the second data signals, each pair of second drive signal pulses being within one bit period of the respective transmit bit of the second data signals, the pulses of each pair of second drive signal pulses being spaced apart by a predetermined time period equal to the period of at least one pulse of the pair of second drive signal pulses and both pulses of each pair of second drive signal pulses having the same logic level;

first switch means, for switching the first electro-optic transducer means between the first mode and the second mode, for coupling the first driving means to the first electro-optic transducer means in the first mode, and for coupling the first reception means to the first electro-optic transducer means in the second mode; and second switch means for switching the second electro-optic transducer means between the first mode and the second mode, for coupling the second driving means to the second electro-optic transducer means in the first mode, and for coupling the second electro-optic transducer means to the second reception means in the second mode.

11. A full-duplex optical transmission system as claimed in claim 10 wherein the time delay between each pulse of the pair of transmit optical signal pulses differs from that of the pair of receive optical signal pulses by one quarter of the data signal bit period.

12. A full-duplex optical transmission system as claimed in claim 11 wherein:

the first driving means further includes first means for generating a first transmit window for inhibiting the reception of the second transmit optical signal pulses by the first electro-optic transducer means, each first transmit window encompassing one first transmit optical signal pulse and being greater than the duration of said first transmit optical signal pulse; and the second driving means further includes second means for generating a second transmit window for inhibiting the reception of the first transmit optical signal pulses by the second electro-optic transducer means, each second transmit window encompassing one second transmit optical signal pulse and being greater than the duration of said second transmit optical signal pulse.

13. A full-duplex optical transmission system as claimed in claim 12 wherein the data signal transmit bit period is divided into twenty equal time intervals, each pulse of a pair of first transmit optical signal pulses and each pulse of a pair of second transmit optical signal pulses occupies a time interval equal to one of the twenty time intervals, the pulses of each pair of either first transmit or second transmit signal pulses occupies the second and seventh time intervals respectively, and the pulses of each pair of the other of first transmit or second transmit signal pulses occupies the second and twelfth time intervals, respectively.

* * * * *